UNITED STATES PATENT OFFICE.

ARTHUR HEINEMANN, OF WEST KENSINGTON, LONDON, ENGLAND.

PRODUCTION OF PHENOLIC CONDENSATION PRODUCTS CAPABLE OF ACTING AS POISONS TO MARINE GROWTHS, BACTERIA, AND THE LIKE.

1,176,056.  Specification of Letters Patent.  Patented Mar. 21, 1916.

No Drawing.  Application filed May 4, 1915.  Serial No. 25,826.

*To all whom it may concern:*

Be it known that I, ARTHUR HEINEMANN, a subject of the German Emperor, and resident of 223 North End road, West Kensington, in the county of London, England, have invented certain new and useful improvements relating to the production of phenolic condensation products capable of acting as poisons to marine growths, bacteria, and the like, of which the following is a specification.

This invention relates to the manufacture of compounds of phenol-formaldehyde condensation products combined with arsenic.

It is the object of the invention to provide a simple, economical and expeditious method of incorporating arsenic in such condensation products.

According to this invention an organic alkyl-arsenic compound is employed for effecting the combination of the arsenic with the condensation product already formed. Cacodylic acid $(CH_3)_2.AsO.OH$. is the body I employ for the purpose as it reacts very easily with the condensate, and may be combined therewith in many different proportions so that the amount of arsenic in the resulting product can be regulated.

In carrying the invention into effect, the condensation product of phenol and formaldehyde is heated until it becomes liquid, and the desired quantity of the cacodylic acid is added, the mixture being well stirred and heated until a thoroughly uniform body results. This body is soluble in the usual solvents for condensation products.

The fact that the arsenic is combined with the condensation product can be proved readily or when the resulting substance is boiled afterward in water, only the excess of cacodylic acid can be washed out, although cacodylic acid or any other arsenic salt which might be formed would be readily soluble in boiling water.

Various formulæ have been advanced by different chemists for the soluble phenol-formaldehyde condensate, and it is unnecessary to detail these here, but it is sufficient to state that it certainly has free OH groups, and that the cacodylic acid doubtless combines with the condensate by displacing such OH groups, to form water with hydrogen obtained from the cacodylic acid.

As a result of actual experiments results were obtained as follows:—1000 grs. of soluble condensate and 107 grs. of cacodylic acid, mixed and heated as above described, gave a body containing on analysis 4.0% of arsenic. This product is of a light orange color. 1000 grs. of condensate and 213 grs. of cacodylic acid gave a body containing 8.4% of arsenic. This product is of a darker orange color. 1000 grs. of condensate and 426 grs. of cacodylic acid gave a body containing 16.5% of arsenic. This product is orange red. These are only mentioned as examples, and the invention is not limited to any particular mixtures giving products containing any definite proportions of arsenic. A content of 16.0% or less of arsenic would be quite sufficient for any purpose herein mentioned.

The new compound made from the condensate and the alkyl-arsenic body is a very effective poison having a rapid destructive action on parasites, bacteria and fungi. The body may be employed in the making of paints, varnishes or coating substances intended to be exposed to the action of any growths, for the purpose of preventing the adherence or formation of such growths on the surface. For example, the body can be employed in making paints or varnishes for application to surfaces exposed to sea water, and it is effective in poisoning marine growths because if such growths endeavor to adhere to a surface containing this compound, they absorb a portion of the compound which itself acts as a poison or is broken up when absorbed. The use of the product is not confined however to the making of marine paints and varnishes, but it may be employed for any other purpose wherein the prevention of parasitic or bacterial growths is a matter of importance.

Wherever in this specification the term "phenol" is used it is intended to cover any equivalent substance belonging to the phenol group.

Having thus described my invention, what I claim as new and desire to secure by Letters Patent is:—

1. A process of combining arsenic with phenol-formaldehyde condensation products, consisting in adding an alkyl-arsenic compound to the condensate in a liquid condition, stirring the mixture and heating the same.

2. A process of combining arsenic with phenol-formaldehyde condensation products, consisting in heating the condensation product until it is in a fluid condition, mixing with it an alkyl-arsenic compound, stirring and heating the mixture until a uniform body results.

3. A process of combining arsenic with phenol-formaldehyde condensation products, consisting in adding cacodylic acid to the condensate while it is in a liquid condition, and stirring and heating the mixture.

In witness whereof I have hereunto signed my name this 13th day of April, 1915, in the presence of two subscribing witnesses.

ARTHUR HEINEMANN.

Witnesses:
 OSCAR A. HEINEMANN,
 CHAS. B. ROBINSON.